United States Patent [19]
Whitney et al.

[11] Patent Number: 5,723,820
[45] Date of Patent: Mar. 3, 1998

[54] DEVICE FOR CHANGING THE RUN DIRECTION OF A PRE-BUSSED RIGID CONDUIT ELECTRICAL DISTRIBUTION SYSTEM

[75] Inventors: Robert L Whitney, Brookville, Ind.; Lisa C. Simmering, Fair Play, S.C.; Aubrey Bryant, Liberty, Ind.; Glenn S. O'Nan, Hamilton, Ohio; Rodney Joe West, Liberty, Ind.; Larry T. Shrout, Middlesex, N.C.

[73] Assignee: Square D Company, Palatine, Ill.

[21] Appl. No.: 207,648

[22] Filed: Mar. 8, 1994

Related U.S. Application Data

[63] Continuation-in-part of Ser. No. 147,611, Nov. 5, 1993.
[51] Int. Cl.[6] .................................................. H01R 4/60
[52] U.S. Cl. ................... 174/99 B; 174/71 R; 174/72 R; 439/210
[58] Field of Search ..................... 174/75 R, 76, 174/81, 74 A, 84 R, 91, 68.1, 68.2, 72 R, 92, 88 R, 135, 71 R, 72 A, 72 C, 88 B, 89, 99 B, 21 R; 439/207, 210, 115

[56] References Cited

U.S. PATENT DOCUMENTS

| | | | |
|---|---|---|---|
| 2,441,461 | 5/1948 | Wayne | 439/115 |
| 3,207,839 | 9/1965 | Joly | 174/72 C |
| 3,982,319 | 9/1976 | Bice | 174/71 R |
| 5,484,300 | 1/1996 | Whitney et al. | 439/207 |

FOREIGN PATENT DOCUMENTS

| | | | |
|---|---|---|---|
| 1275982 | 10/1961 | France | 174/89 |
| 1510090 | 1/1968 | France | 439/207 |
| 0018282 | 10/1901 | United Kingdom | 174/72 R |
| 0818297 | 8/1959 | United Kingdom | 174/92 |
| 2205200 | 11/1988 | United Kingdom | 174/72 C |

*Primary Examiner*—Hyung S. Sough
*Attorney, Agent, or Firm*—Larry I. Golden; David R. Stacey; Larry T. Shrout

[57] ABSTRACT

An device for changing the run direction of a pre-bussed rigid conduit electrical distribution system. The device has a number of electrical conductor assemblies which are substantially enclosed within a hollow housing. The housing has three legs which are integrally joined at a common point. Each leg has an associated end from which an equal length of each electrical conductor assembly extends. A uniform and continuous support is provided for that portion of each electrical conductor assembly which is enclosed within the housing.

19 Claims, 6 Drawing Sheets

5,723,820

DEVICE FOR CHANGING THE RUN DIRECTION OF A PRE-BUSSED RIGID CONDUIT ELECTRICAL DISTRIBUTION SYSTEM

This application is a continuation-in-part of application Ser. No. 08/147,611, filed Nov. 5, 1993, and incorporated herein by reference.

FIELD OF THE INVENTION

Electrical distribution feeder systems for use in industrial and commercial locations.

BACKGROUND OF THE INVENTION

Industrial and commercial electrical distribution feeder systems are generally one of three types: cable and conduit, cable and cable tray, or electrical busway. Straight runs of any one of these three systems are relatively easy to install. However, when a change of run direction is required, the installation time and cost increases significantly. Pulling cable through an elbow is very difficult and time consuming, especially when multiple cables must be pulled in a single conduit. In most cable tray installations the cable tray is supported by drop rods suspended from roof supports or I-beams. When the electrician installs cable, these drop rods are obstacles which prevent him from easily "laying in" the cable. A change in the cable tray run direction generally requires additional supports and therefore additional drop rods which the electrician must maneuver the cable around. Busway installations are generally simpler than conduit and cable or cable tray and cable since the conductors are already inside a protective enclosure, therefore no additional labor is required for wiring after the busway is installed. Busway, however, is a manufactured product and therefore generally has a higher cost per foot than equivalent cable and conduit or cable and cable tray. The higher cost per device may somewhat offset the lower installation cost. Busway is most cost effective in higher amperages where large or multiple cables must be used. Therefore it would be desirable to have a distribution system which is generally comparable in cost to the component prices of conduit and cable and have easily installed component sections like busway.

SUMMARY OF THE INVENTION

The present invention provides a relatively low cost and easily installed means to change the run direction of pre-bussed rigid conduit electrical feeder system of the type disclosed in U.S. Pat. No. 5,266,044 and U.S. patent application Ser. No. 08/085,341, incorporated herein by reference. The invention provides an easily installed Tee fitting which permits the installer to change the run direction of the distribution system by 90° while continuing along the original run direction, or, alternatively, to change from the original run direction two separate run directions which are perpendicular to the original run direction. A cable and conduit installation would require a junction box to enclose the spliced cable connection. This would increase the installation time and cost due to the junction box, additional conduit fittings and labor.

Other features and advantages of the invention will become apparent to those skilled in the art upon review of the following detailed description, claims and drawings.

Figure 1:
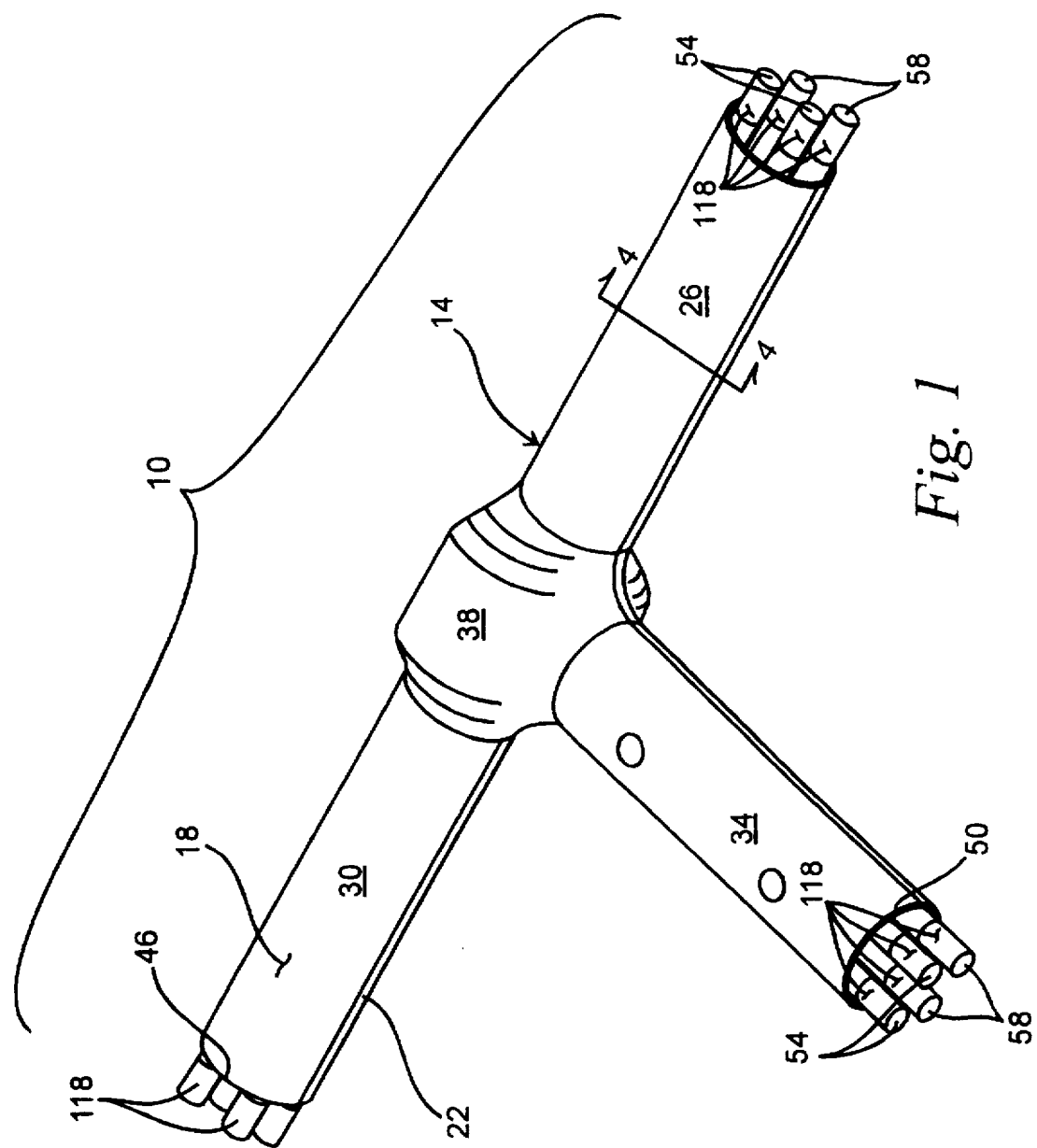
FIG. 1 is an isometric view of a Tee fitting for changing the run direction of a pre-bussed rigid conduit electrical distribution system made in accordance with the present invention.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

FIG. 1 illustrates a Tee fitting manufactured in accordance with the present invention and generally indicated by the reference numeral 10. The Tee 10 has a housing 14 assembled from a first half 18 and a second half 22 each preferably made from an electrically conductive material such as aluminum. The housing 14 includes a first leg 26, a second leg 30, and a third leg 34, each approximately the same length and all being integrally joined together at a bulge 38 in the housing 14. The housing halves 18 and 22 are constructed such that each half 18 and 22 includes one half of each of the three legs 26, 30 and 34. The first and second legs, 26 and 30 respectively, are aligned such that they share a common axis. The axis of the third leg 34 is generally perpendicular to the common axis of the first and second legs, 26 and 30 respectively, such that the housing 14 is generally T-shaped and includes a first end 42, a second end 46 and a third end 50. A first electrical conductor assembly 54 associated with the first housing half 18 and a second electrical conductor assembly 58 associated with the second housing half 22 are substantially enclosed within the housing 14. The housing 14 provides support and protection for the conductor assemblies 54 and 58 and can also serve as the system ground conductor when it is made from electrically conductive material according to the preferred embodiment.

Figure 2:
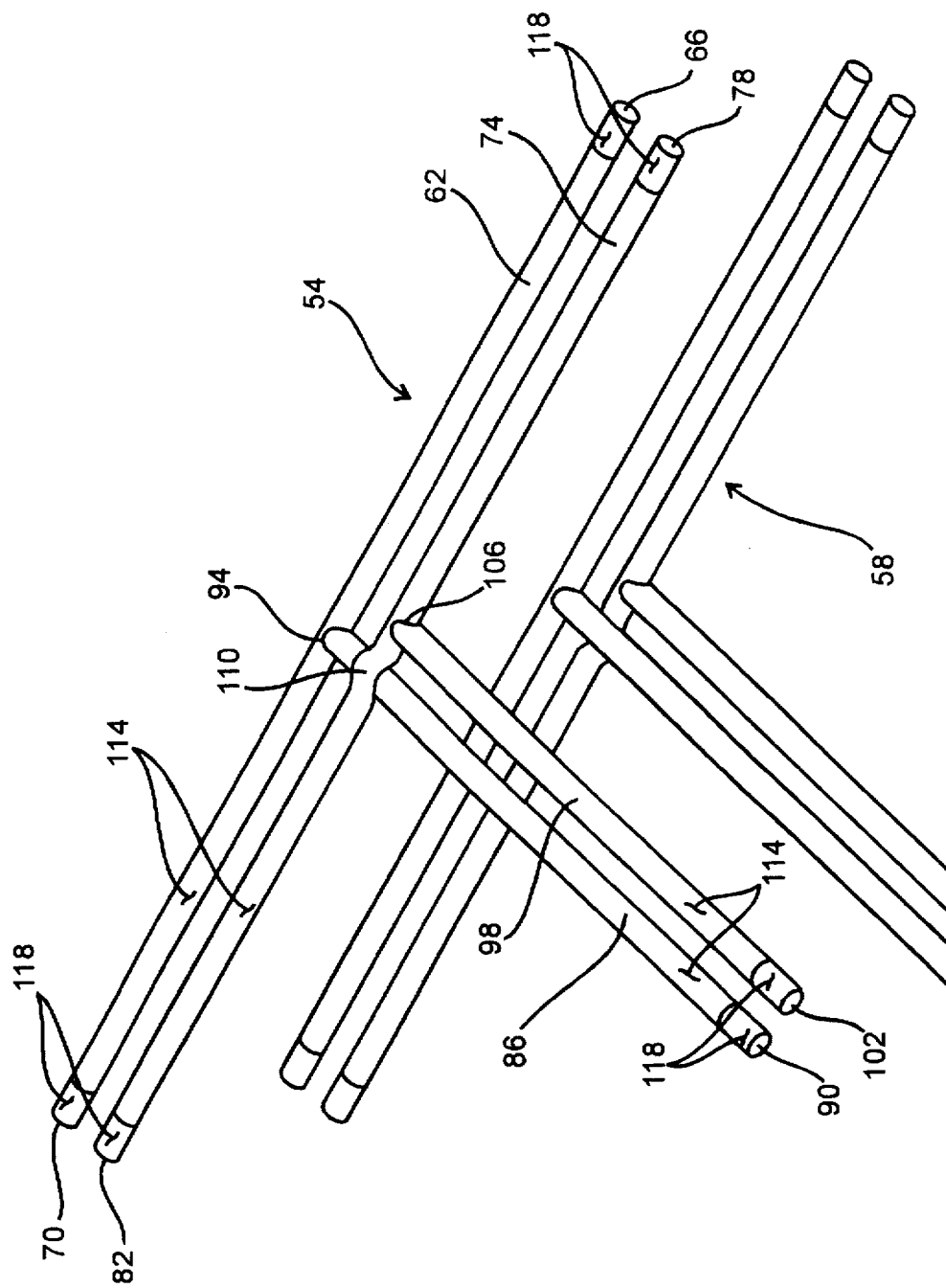
FIG. 2 is an isometric view of the Tee fitting busbar assemblies according to the present invention.

Referring now to FIG. 2, it can be seen that the first and second electrical conductor assemblies, 54 and 58 respectively, are mirror images of one another. For the purpose of simplification of description, only the first conductor assembly 54 will be described in detail. The first conductor assembly 54 includes a first electrical conductor 62 having a first end 66 and a second end 70, a second electrical conductor 74 having a first end 78 and a second end 82, a third electrical conductor 86 having a first end 90 and a second end 94, and a fourth electrical conductor 98 having a first end 102 and a second end 106. The first and second conductors, 62 and 74 respectively, are generally parallel with one another such that their longitudinal axes lie in a common plane. The third and fourth conductors, 86 and 98 respectively, are also generally parallel with one another such that their longitudinal axes lie in the same plane as the longitudinal axes of first and second conductors, 62 and 74 respectively. However, the longitudinal axes of the third and fourth conductors, 86 and 98 respectively, are generally perpendicular to the longitudinal axes of the first and second conductors, 62 and 74 respectively. The second end 94 of the third conductor 86 is electrically connected, by means such as welding, to the first conductor 62 at a point nearly half way between its first end 66 and second end 70. The second end 106 of the fourth conductor 98 is electrically connected, by means such as welding, to the second conductor 74 at a point nearly half way between its first end 78 and second end 82. Since all of the conductors 62, 74, 86 and 98 lie in the same plane and are generally straight and substantially rigid, an interference will occur between the second conductor 74 and the third conductor 86. Therefore, a deformation 110 is placed in the second conductor 74 at the point of interference with the third conductor 86. The deformation 110 in the second conductor 74 is of sufficient size and shape to permit the third conductor 86 to pass by the second conductor 74 without physically contacting it or requiring any deformation in the third conductor 86 to effect the passage. After being electrically connected together and deformed as required, the conductors are covered by an electrically insulating sheath 114 such as heat shrinkable tubing, electrical tape, polyethylene terephthalate tubing or powder coating. A portion of the sheath 114 is removed from the first ends 66 and 78 and second ends 70 and 82 of the first and second conductors, 62 and 74 respectively, and also from the first ends 90 and 102 of the third and fourth conductors, 86 and 98 respectively, to form electrical contact surfaces 118. As shown in FIG. 1 the first ends 66 and 78 and second ends 70 and 82 of the first and second conductors, 62 and 74 respectively, and the first ends 90 and 102 of the third and fourth conductors, 86 and 98 respectively, each extend outwardly an equal length from the first, second and third ends, 42, 46 and 50 respectively, of the housing 14 such that the contact surface 118 at each of those ends is exposed.

Figure 3:
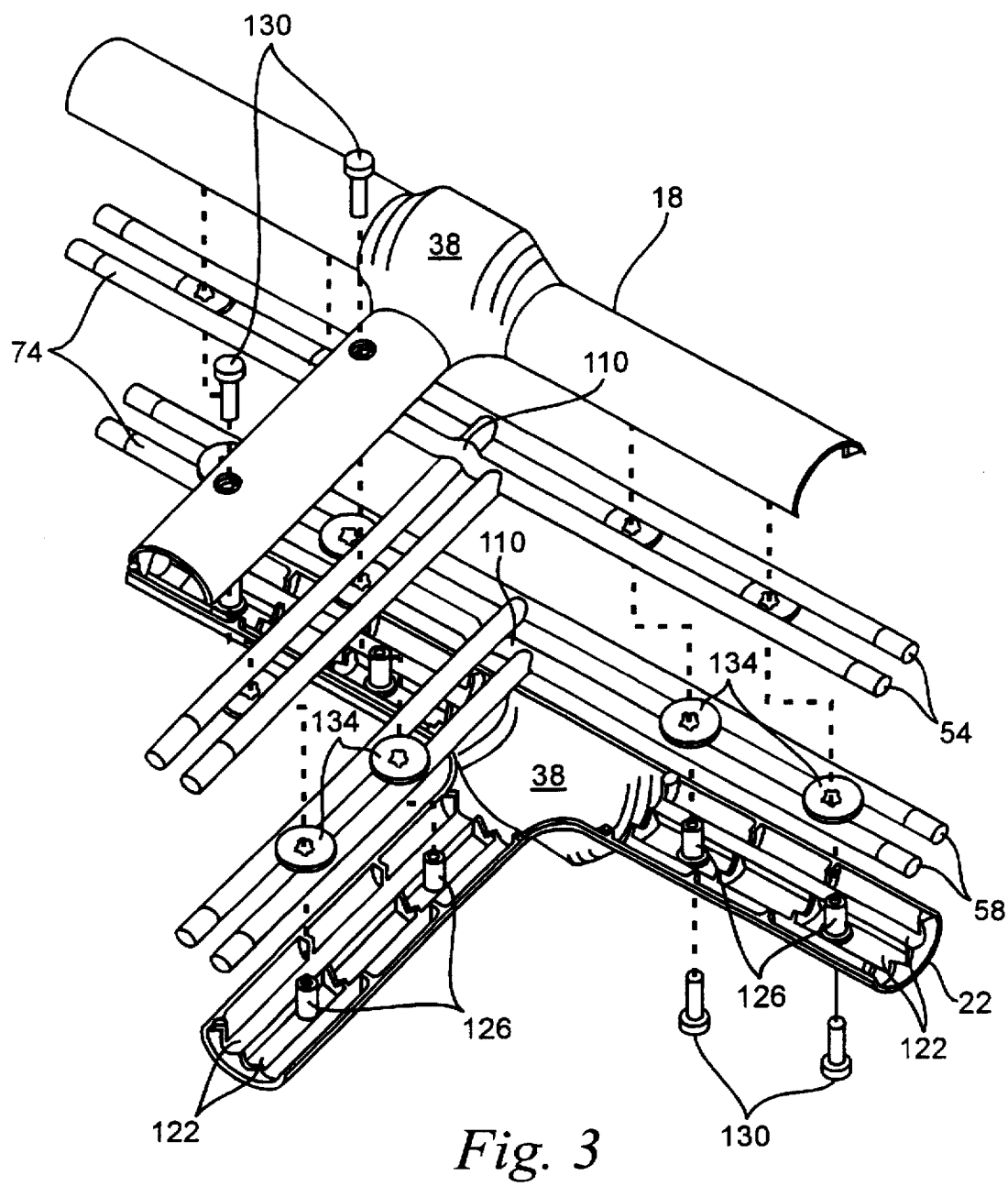
FIG. 3 is an exploded view of a Tee fitting made in accordance with the present invention.
Figure 4:
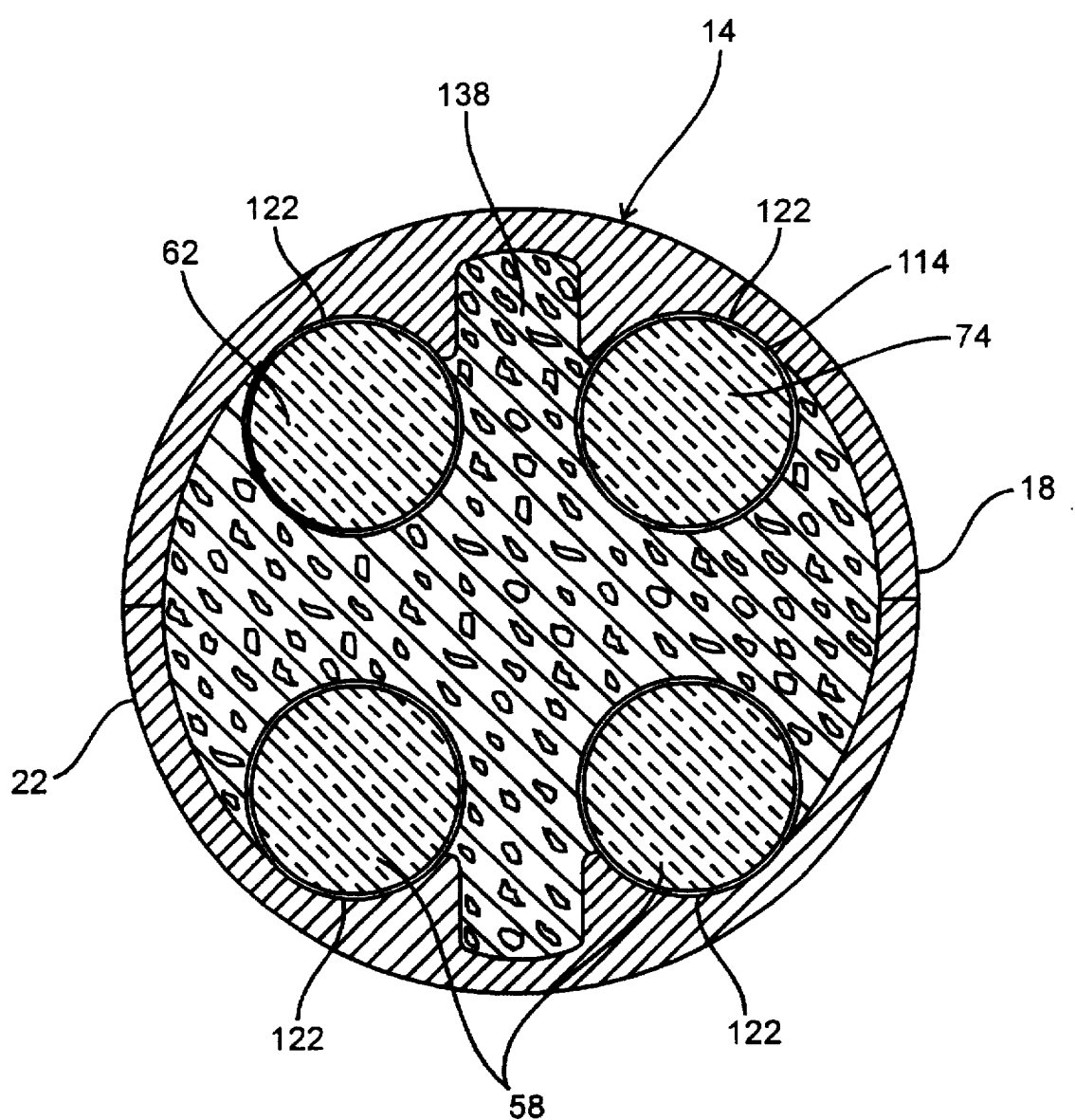
FIG. 4 is a cross-sectional view taken along line 4—4 of FIG. 1.

Referring now to FIG. 3, it can be seen that each housing half 18 and 22 has a number of integrally formed conductor supports 122 on which the conductor assemblies 54 and 58 are placed. The bulge 38 provides a clearance space inside the housing 14 for the deformations 110 in the second conductors 74. Each housing half 18 and 22 also includes a number of integrally formed towers 126 which provide a means for securing the housing halves 18 and 22 together by receiving fasteners 130 such as screws or rivets. The towers 126 also provide a means for securing the conductor assemblies 54 and 58 within the housing 14 and maintaining proper spacing between individual conductors of the conductor assemblies 54 and 58 during the assembly process. The conductor assemblies 54 and 58 are placed in their associated housing halves, 18 and 22 respectively, such that they rest on the conductor supports 122 and are immediately adjacent to the towers 126. Commercially available push on retaining washers 134 are used to captivate the conductors assemblies 54 and 58 in their associated housing halves, 18 and 22 respectively. This is accomplished by pushing the retaining washers 134 down on the towers 126 such that they engage the conductor assemblies 54 and 58, thereby holding them firmly against the conductor supports 122. After preassembling the first and second housing halves 18 and 22 as described above, the housing halves are assembled together by the fasteners 130 which are received in the towers 126. After the first and second housing halves, 18 and 22 respectively, have been assembled an expandable foam 138, such as a polyurethane foam, is introduced into the generally hollow interior defined by the housing 14, in liquid form. As shown in FIG. 4, the foam 138 expands to completely fill the interior of the housing 14 thereby providing continuous support for the conductor assemblies 54 and 58 enclosed within the housing 14.

Figure 5:
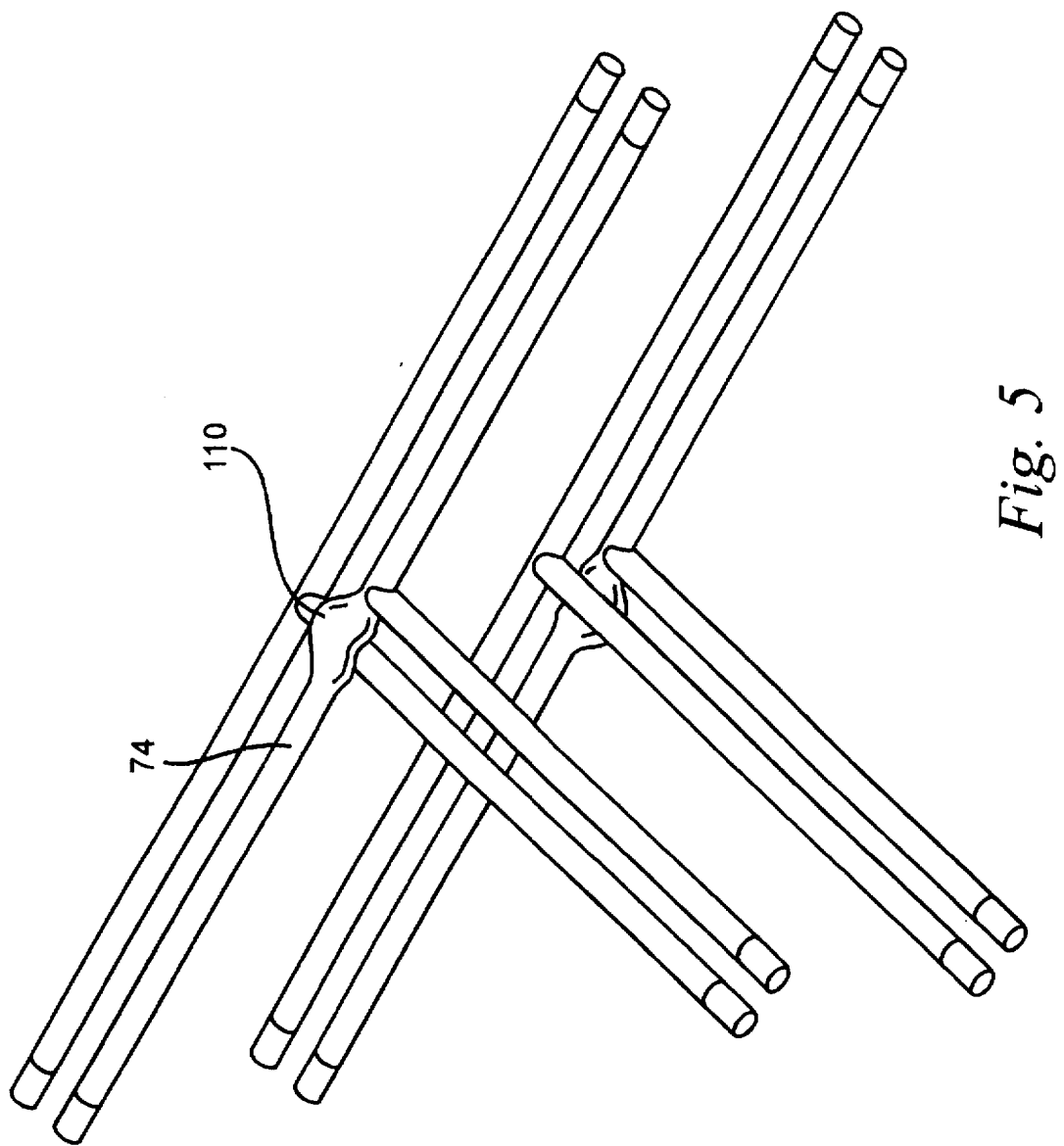
FIG. 5 is an isometric view of an alternate construction of the Tee fitting busbar assemblies according to the present invention.

FIGS. 5 illustrates alternate constructions in which the height of the bulge 38 is kept to a minimum by flattening out the electrical conductor 74 at the deformation 110. This reduces the height of the deformation 110 and thereby allows the height of the bulge 38 in the housing 14 to be reduced.

Figure 6:
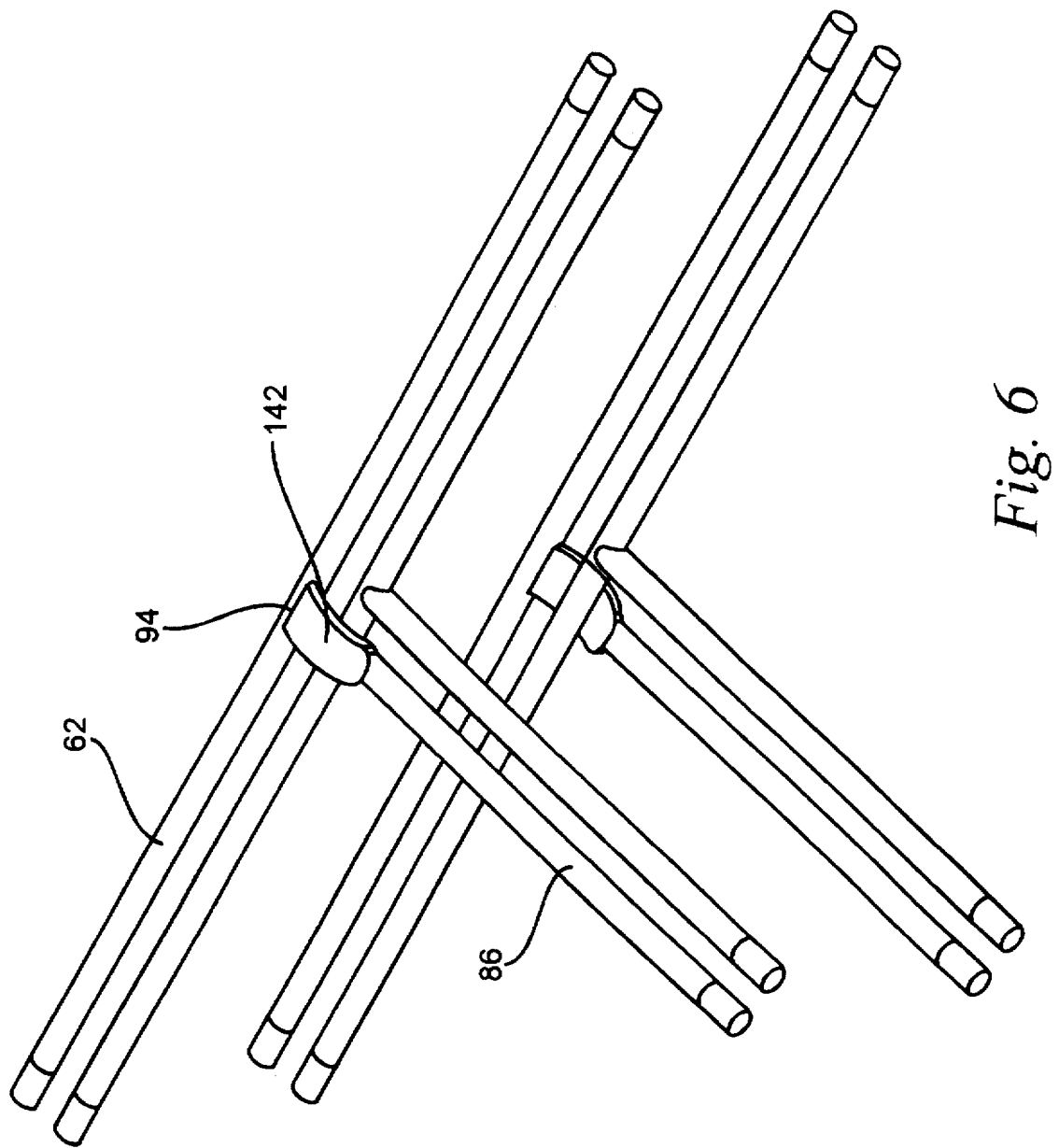
FIG. 6 is an isometric view of a second alternate construction of the Tee fitting bus bar assemblies according to the present invention.

FIGS. 6 illustrates second alternate constructions in which the height of the bulge 38 is kept to a minimum by flattening out the electrical conductor 86 at a deformation 142. Again the reduced height of the deformation 142 allows the height of the bulge 38 in the housing 14 to be reduced. Flattening the second end 94 of conductor 86 also makes a better joint between the conductors 86 and 62 for welding.

We claim:

1. A device for changing the run direction of a sectionalized electrical distribution system, said device comprising:
   a) a housing defining a hollow interior and having a first leg, a second leg and a third leg, said legs being integrally joined together at a common junction in said housing, said housing having a first end associated with said first leg, a second end associated with said second leg and a third end associated with said third leg;
   b) a first electrical conductor assembly substantially enclosed within said housing;
   c) a second electrical conductor assembly substantially enclosed within said housing;
   d) a plurality of conductor supports each being integrally formed from said housing and wherein at least one of said supports extends generally between said common junction and each of said first, second and third ends;
   e) said first and second electrical conductor assemblies each having an end portion extending outwardly from each of said housing ends a predetermined and generally equal length; and
   f) means for continuously and uniformly supporting a portion of said first and second conductor assemblies intermediate said end portions and enclosed within said housing.

2. The device of claim 1 wherein said first and second legs of said housing share a common axis and wherein said third leg of said housing has an axis generally perpendicular to said common axis of said first and second legs such that said housing is generally T-shaped.

3. The device of claim 2 wherein each said electrical conductor assembly further comprises:
   a) a generally straight first conductor having a first end and a second end;
   b) a generally straight second conductor having a first end, and a second end, said first and second conductors being generally parallel to one another and enclosed within said first and second legs of said housing;
   c) a third conductor having a first end and a second end electrically connected to said first conductor proximate a midpoint between its first and second ends; and
   d) a generally straight fourth conductor having a first end and a second end electrically connected to said second conductor proximate a midpoint between its first and second ends, said third and fourth conductors being generally parallel to one another and generally enclosed within said third leg of said housing.

4. The device of claim 3 wherein said first, second, third, and fourth conductors of said first and second conductor assemblies are enclosed within an electrically insulating sheath.

5. The device of claim 4 wherein a portion of said sheath is removed from said first and second ends of said first and second conductors and said first ends of said third and fourth conductors proximate said end portions of said conductor assemblies which extend outwardly of said housing ends thereby providing an electrical contact surface for making an electrical connection with corresponding electrical conductors of adjacent sections of said electrical distribution system.

6. The device of claim 3 wherein said first, second, third and fourth conductors all lie in the same plane.

7. The device of claim 6 wherein said third conductor has a deformation proximate its second end such that said third conductor may pass by said second conductor.

8. The device of claim 7 wherein said common junction further comprises a bulge in said housing for providing clearance for said deformation in said third conductor.

9. The device of claim 1 wherein said housing is divided into a first half and a second half such that each of said first and second halves includes one half of said first, second and third legs.

10. The device of claim 9 wherein each said housing half further includes in each of said legs a plurality of towers, each integrally formed from a portion of said housing half.

11. The device of claim 10 wherein a retaining washer is pushed onto each said tower for securing said electrical conductor assemblies securely to each said housing half.

12. The device of claim 11 wherein said housing halves are secured together by a plurality of screws.

13. The device of claim 1 wherein said means for continuously and uniformly supporting said conductors is provided by an expandable foam inserted into said housing.

14. A device for changing the run direction of a sectionalized electrical distribution system, said device comprising:

a) a first electrical conductor assembly;

b) a second electrical conductor assembly;

c) a housing defining a hollow interior for substantially enclosing said first and second electrical conductor assemblies and having a first leg, a second leg and a third leg, said legs being integrally joined together at a common junction in said housing, said housing having a first end associated with said first leg, a second end associated with said second leg, a third end associated with said third leg, said housing being divided into a first half and a second half such that each of said first and second halves includes one half of said first, second and third legs, and means integrally constructed from said housing generally along a longitudinal axis of each said leg for supporting and separating said first and second electrical conductor assemblies;

d) said first and second electrical conductor assemblies each having end portions extending outwardly from each of said housing ends a predetermined and generally equal length; and e) means for continuously and uniformly supporting a portion of said first and second conductor assemblies intermediate said end portions and enclosed within said housing.

15. The device of claim 14 wherein said means for supporting and separating said first and second electrical conductor assemblies comprises a plurality of towers intermediate a pair of conductor supports in each of said leg halves.

16. The device of claim 15 wherein a retaining washer is pushed onto each said tower for securing one of said first or second electrical conductor assemblies securely against said conductor supports in one of said housing halves, said washers being frictionally retained on said towers.

17. The device of claim 16 wherein said housing halves are secured together by a plurality of screws.

18. The device of claim 17 wherein said means for continuously and uniformly supporting said conductors is provided by an expandable foam inserted into said housing.

19. The device of claim 6 wherein said second conductor has a deformation proximate its midpoint such that said third conductor can pass by said second conductor.

* * * * *